US010451511B2

(12) United States Patent
Martin et al.

(10) Patent No.: US 10,451,511 B2
(45) Date of Patent: *Oct. 22, 2019

(54) HEADER ASSEMBLY FOR A PRESSURE SENSOR

(71) Applicant: KULITE SEMICONDUCTOR PRODUCTS, INC., Leonia, NJ (US)

(72) Inventors: Richard Martin, Ridgewood, NJ (US);
Louis DeRosa, Wayne, NJ (US);
Robert Gardner, Westwood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/789,178

(22) Filed: Oct. 20, 2017

(65) Prior Publication Data

US 2018/0038756 A1 Feb. 8, 2018

Related U.S. Application Data

(63) Continuation of application No. 15/399,806, filed on Jan. 6, 2017, now Pat. No. 9,835,512, which is a continuation of application No. 14/301,742, filed on Jun. 11, 2014, now Pat. No. 9,566,656.

(60) Provisional application No. 61/889,671, filed on Oct. 11, 2013.

(51) Int. Cl.
*G01L 19/00* (2006.01)
*B23K 1/00* (2006.01)
*B23K 101/38* (2006.01)

(52) U.S. Cl.
CPC ........ *G01L 19/0069* (2013.01); *B23K 1/0008* (2013.01); *B23K 1/0016* (2013.01); *G01L 19/0084* (2013.01); *B23K 2101/38* (2018.08)

(58) Field of Classification Search
CPC ....... G01L 19/00; G01L 19/0069; G01L 9/00; G01L 7/00; B23K 1/0016; B23K 2201/38; H01C 10/10
USPC .......................................................... 73/756
See application file for complete search history.

(56) References Cited

U.S. PATENT DOCUMENTS

| 3,775,645 | A | * | 11/1973 | McCarthy | H01L 23/049 174/549 |
| 4,764,747 | A | * | 8/1988 | Kurtz | G01L 19/0645 338/2 |
| 6,091,022 | A | * | 7/2000 | Bodin | G01L 19/0084 174/528 |
| 6,591,686 | B1 | | 7/2003 | Kurtz | |
| 7,212,096 | B2 | | 5/2007 | Kurtz et al. | |
| 7,331,241 | B1 | | 2/2008 | Kurtz et al. | |
| 7,369,032 | B2 | | 5/2008 | Kurtz et al. | |
| 7,841,240 | B2 | | 11/2010 | Kurtz et al. | |
| 8,863,582 | B2 | | 10/2014 | Kurtz et al. | |

(Continued)

*Primary Examiner* — Octavia Hollington
(74) *Attorney, Agent, or Firm* — Troutman Sanders LLP; James E. Schutz; Mark Lehi Jones

(57) ABSTRACT

A header assembly for a pressure sensor and methods for manufacturing and using the same are provided. In one example embodiment, a header insert may include a base; a hollow protrusion coupled to the base and having a metalized inner surface and a metalized outer surface, wherein the metalized outer surface of the hollow protrusion is used to couple to a header and the metalized inner surface of the hollow protrusion is used to couple to a header pin; and wherein a seal is formed between the header, the header insert and the header pin.

20 Claims, 7 Drawing Sheets

(56) References Cited

U.S. PATENT DOCUMENTS

| | | | |
|---|---|---|---|
| 9,835,512 B2 * | 12/2017 | Martin | B23K 1/0008 |
| 2004/0135666 A1 | 7/2004 | Kurtz et al. | |
| 2017/0031040 A1 * | 2/2017 | Goenner | B06B 1/06 |

* cited by examiner

400

```
┌─────────────────────────────────────────┐
│ IN A HEADER ASSEMBLY CONFIGURED TO      │
│ INCLUDE A HEADER DISPOSED AROUND AND    │
│ DEFINING AN APERTURE, A HEADER INSERT   │─ 401
│ HAVING A HOLLOW PROTRUSION, AND A       │
│ HEADER PIN, METALIZING AN INNER SURFACE │
│ AND AN OUTER SURFACE OF THE HOLLOW      │
│ PROTRUSION OF THE HEADER INSERT         │
└─────────────────────────────────────────┘
                    │
                    ▼
┌─────────────────────────────────────────┐
│ PLACING THE HEADER INSERT IN THE HEADER │
│ SUCH THAT THE METALIZED OUTER SURFACE OF│─ 403
│ THE HOLLOW PROTRUSION IS DISPOSED IN THE│
│ APERTURE OF THE HEADER                  │
└─────────────────────────────────────────┘
                    │
                    ▼
┌─────────────────────────────────────────┐
│ PLACING THE HEADER PIN IN THE HOLLOW    │
│ PROTRUSION SUCH THAT THE METALIZED INNER│─ 405
│ SURFACE OF THE HOLLOW PROTRUSION IS     │
│ COUPLED TO THE HEADER PIN               │
└─────────────────────────────────────────┘
                    │
                    ▼
┌─────────────────────────────────────────┐
│ BRAZING THE METALIZED OUTER SURFACE OF  │
│ THE HOLLOW PROTRUSION TO THE INNER      │
│ SURFACE OF THE HEADER AND THE METALIZED │─ 407
│ INNER SURFACE OF THE HOLLOW PROTRUSION  │
│ TO THE HEADER PIN TO FORM A SEAL        │
└─────────────────────────────────────────┘
```

FIG. 4

HEADER ASSEMBLY FOR A PRESSURE SENSOR

CROSS-REFERENCE TO RELATED APPLICATIONS

This application is a continuation of U.S. patent application Ser. No. 15/399,806, filed 6 Jan. 2017, entitled "Header Assembly for a Pressure Sensor," and published as U.S. Patent Publication US 2017/0115176 on 27 Apr. 2017. U.S. patent application Ser. No. 15/399,806 is a continuation of U.S. patent application Ser. No. 14/301,742, filed 11 Jun. 2014, entitled "Header Assembly for a Pressure Sensor," published as U.S. Patent Publication US 2015/0101416 on 16 Apr. 2015, and issued as U.S. Pat. No. 9,566,656 on 14 Feb. 2017, the contents of which are incorporated herein by reference as if presented in full.

U.S. patent application Ser. No. 14/301,742 claims priority under 35 U.S.C. § 119(e) to U.S. Prov. App. No. 61/889,671, entitled "ONE PIECE CERAMIC HEADER INSERT," filed 11 Oct. 2013, the contents of which is hereby incorporated by reference as if fully set forth herein.

TECHNICAL FIELD

The present invention relates generally to sensors and more particularly to a header assembly for a pressure sensor and methods for manufacturing and using the same.

BACKGROUND

Traditional headers for pressure sensors are made either with glass-to-metal seals or brazed ceramic-to-metal seals. For example, FIG. 1 shows a prior art glass-sealed metal header assembly 100. In FIG. 1, the header assembly 100 is configured to include a metal header 101, a header pin 103 and a glass frit 105. The header 101 has the header pin 103 sealed to the metal header 101 using the glass frit 105. The glass frit 105 forms a compression seal where the glass frit 105 is compressed inside the metal header 101 after heating the metal header at high temperature and allowing the assembly to cool to room temperature. Since the melting temperature of the glass frit 105 is much higher than the operating temperature of the header assembly 100, the glass frit 105 provides a seal over the full operating temperature range of the header assembly 100. Current ceramic headers are similar to glass-sealed headers except that the seals for the ceramic headers are made by brazing a metalized ceramic to a metal header. Further, current ceramic headers use individual pieces of metalized ceramic for each pin in the header. Accordingly, there is a need for improved techniques relating to a header for a pressure sensor and methods for manufacturing and using the same. In addition, other desirable features and characteristics of the present disclosure will become apparent from the subsequent detailed description and claims, taken in conjunction with the accompanying figures and the foregoing technical field and background.

SUMMARY OF THE DISCLOSURE

Briefly described, embodiments of the present disclosure relate to a header assembly for a pressure sensor and methods for manufacturing and using the same. According to one aspect, a header insert may be configured to include a base and a hollow protrusion. The hollow protrusion may have a metalized inner surface and a metalized outer surface. Further, the hollow protrusion may be coupled to the base. The metalized outer surface of the hollow protrusion may be used to couple to a header and the metalized inner surface of the hollow protrusion may be used to couple to a header pin. Also, a seal may be formed between the header, the header insert and the header pin.

According to another aspect, a header assembly by a process may be configured to include a header disposed around and defining an aperture, a header insert having a hollow protrusion, and a header pin. The header assembly by the process may include metalizing an inner surface of the hollow protrusion to form a metalized inner surface. Further, the header assembly by the process may include metalizing an outer surface of the hollow protrusion to form a metalized outer surface. The header assembly by the process may include placing the header insert in the header such that the outer surface of the metalized hollow protrusion may be disposed in the aperture and may be coupled to a surface of the header associated with the aperture. Further, the header assembly by the process may include placing the header pin in the hollow protrusion such that the metalized inner surface of the hollow protrusion may be coupled to the header pin. Finally, the header assembly by the process may include brazing the metalized outer surface of the hollow protrusion to the inner surface of the header and the metalized inner surface of the hollow protrusion to the header pin. Also, a seal may be formed between the header, the header insert and the header pin.

BRIEF DESCRIPTION OF THE DRAWINGS

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where:

FIG. 2A provides a top view of one embodiment of the header insert. FIG. 2B provides a longitudinal cross-sectional view along section A-A of FIG. 2A of one embodiment of the header insert. FIG. 2C provides a perspective view of one embodiment of the header insert.

FIG. 3A provides a top view of one embodiment of the header assembly. FIG. 3B provides a longitudinal cross-sectional view along section A-A of FIG. 3A of one embodiment of the header assembly.

FIG. 4 is a flowchart of one embodiment of a header assembly by a process in accordance with various aspects as described herein.

DETAILED DESCRIPTION

Figure 1:
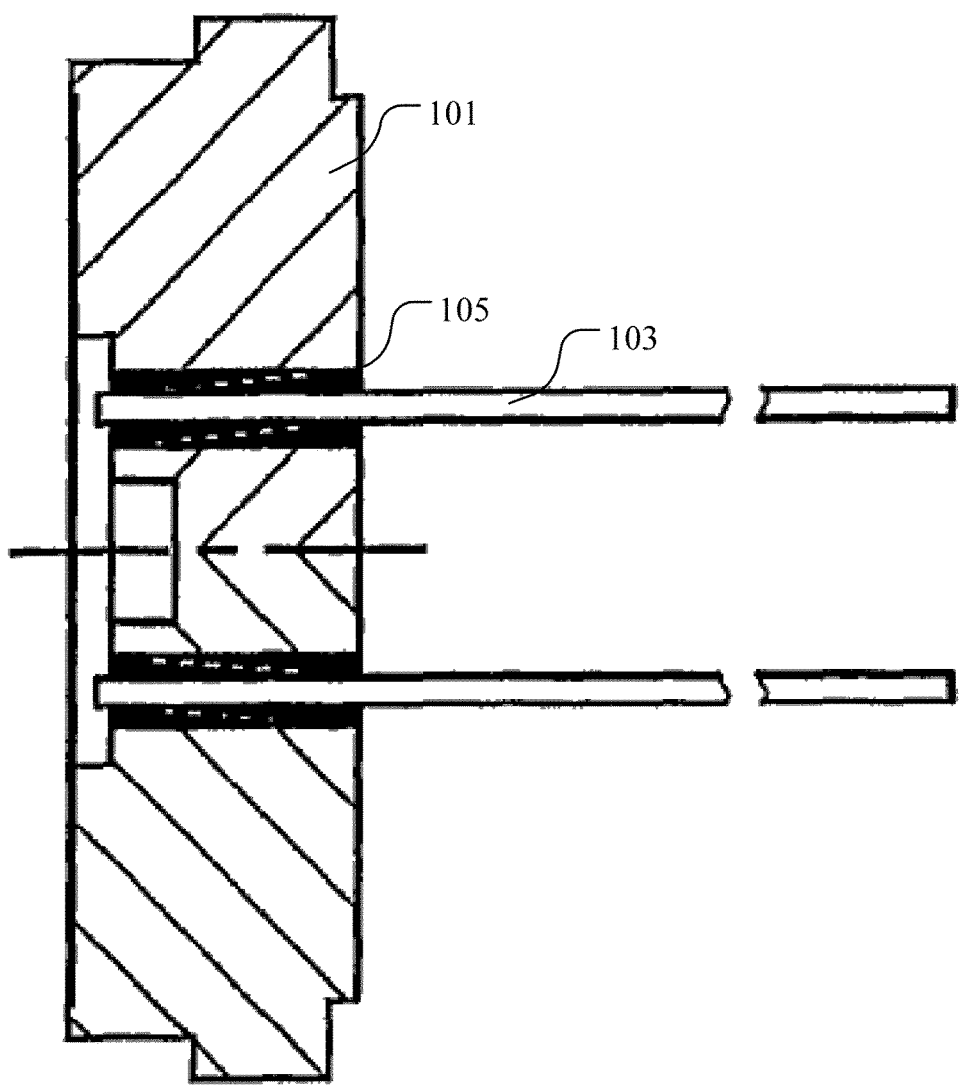
FIG. 1 shows a prior art glass-sealed metal header assembly.

The following detailed description is merely illustrative in nature and is not intended to limit the present disclosure, or the application and uses of the present disclosure. Furthermore, there is no intention to be bound by any expressed or implied theory presented in the preceding field of use, background, or summary of the disclosure or the following detailed description. The present disclosure provides various examples, embodiments and the like, which may be described herein in terms of functional or logical block elements. Various techniques described herein may be used for a header assembly for a pressure sensor and methods for manufacturing and using the same. The various aspects described herein are presented as methods, devices (or apparatus), and systems that may include a number of components, elements, members, modules, nodes, peripherals, or the like. Further, these methods, devices, and systems may include or not include additional components, elements, members, modules, nodes, peripherals, or the like.

Throughout the specification and the claims, the following terms take at least the meanings explicitly associated herein, unless the context clearly dictates otherwise. The terms "connect," "connecting," and "connected" mean that one function, feature, structure, or characteristic is directly joined to or in communication with another function, feature, structure, or characteristic. The terms "couple," "coupling," and "coupled" mean that one function, feature, structure, or characteristic is directly or indirectly joined to or in communication with another function, feature, structure, or characteristic. Relational terms such as "first" and "second," and the like may be used solely to distinguish one entity or action from another entity or action without necessarily requiring or implying any actual such relationship or order between such entities or actions. The term "or" is intended to mean an inclusive or. Further, the terms "a," "an," and "the" are intended to mean one or more unless specified otherwise or clear from the context to be directed to a singular form. The term "include" and its various forms are intended to mean including but not limited to. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%.

In the following description, numerous specific details are set forth. However, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

Figure 2A:
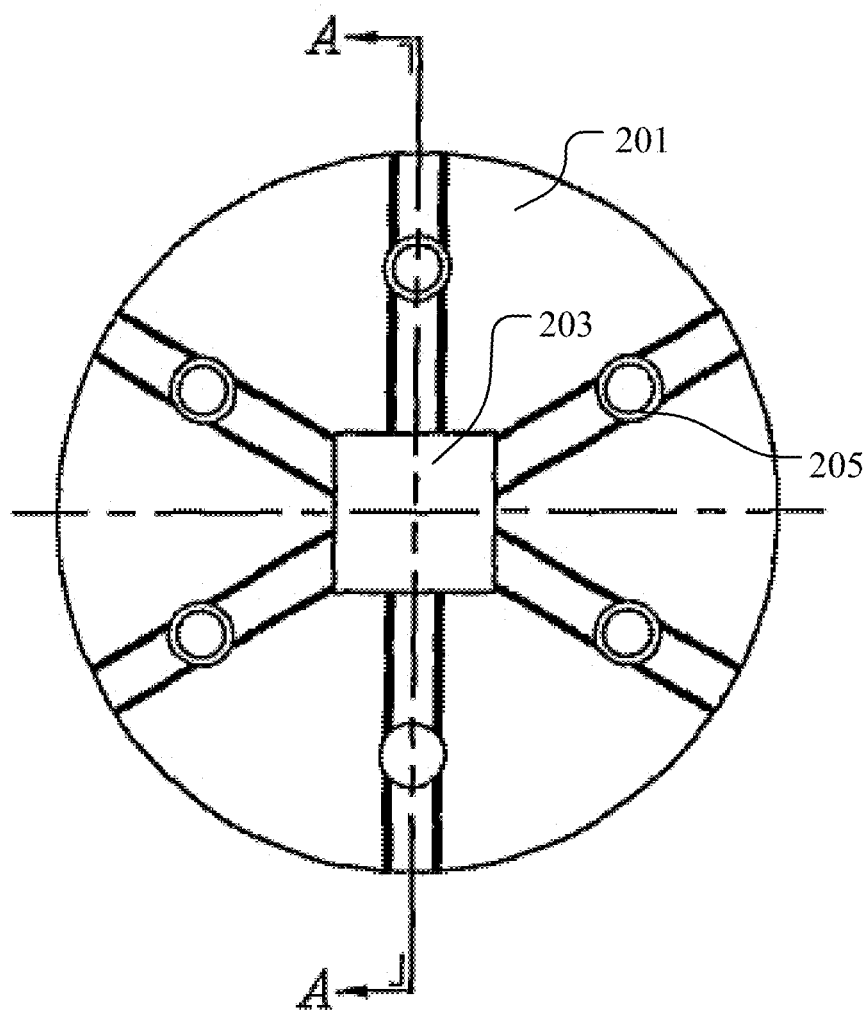
FIGS. 2A, 2B and 2C illustrate one embodiment of a header insert in accordance with various aspects as described herein.
Figure 2B:
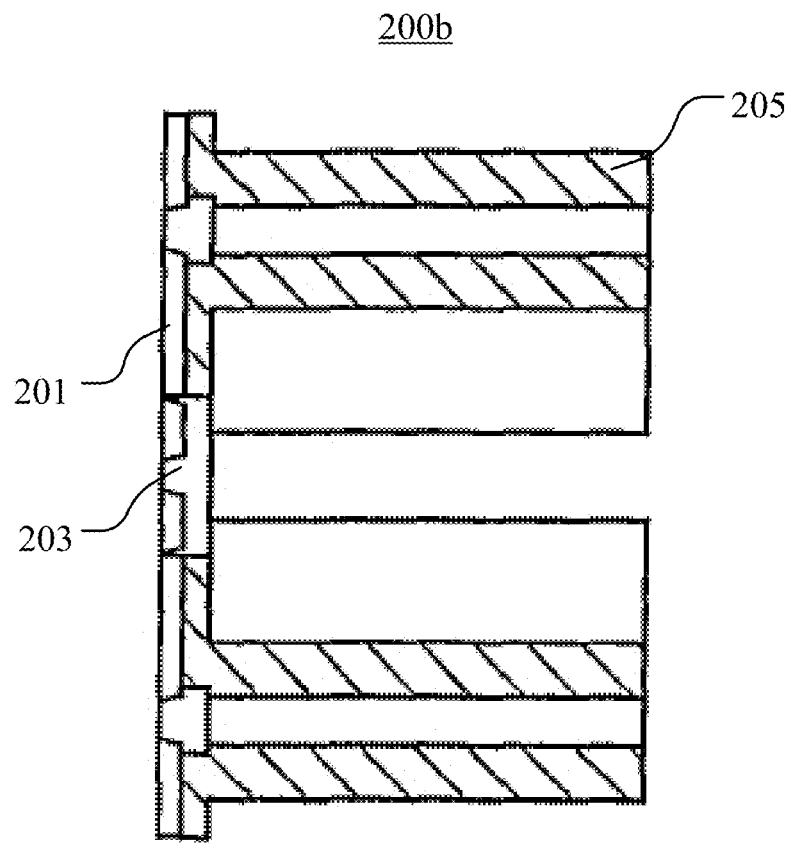
Figure 2C:
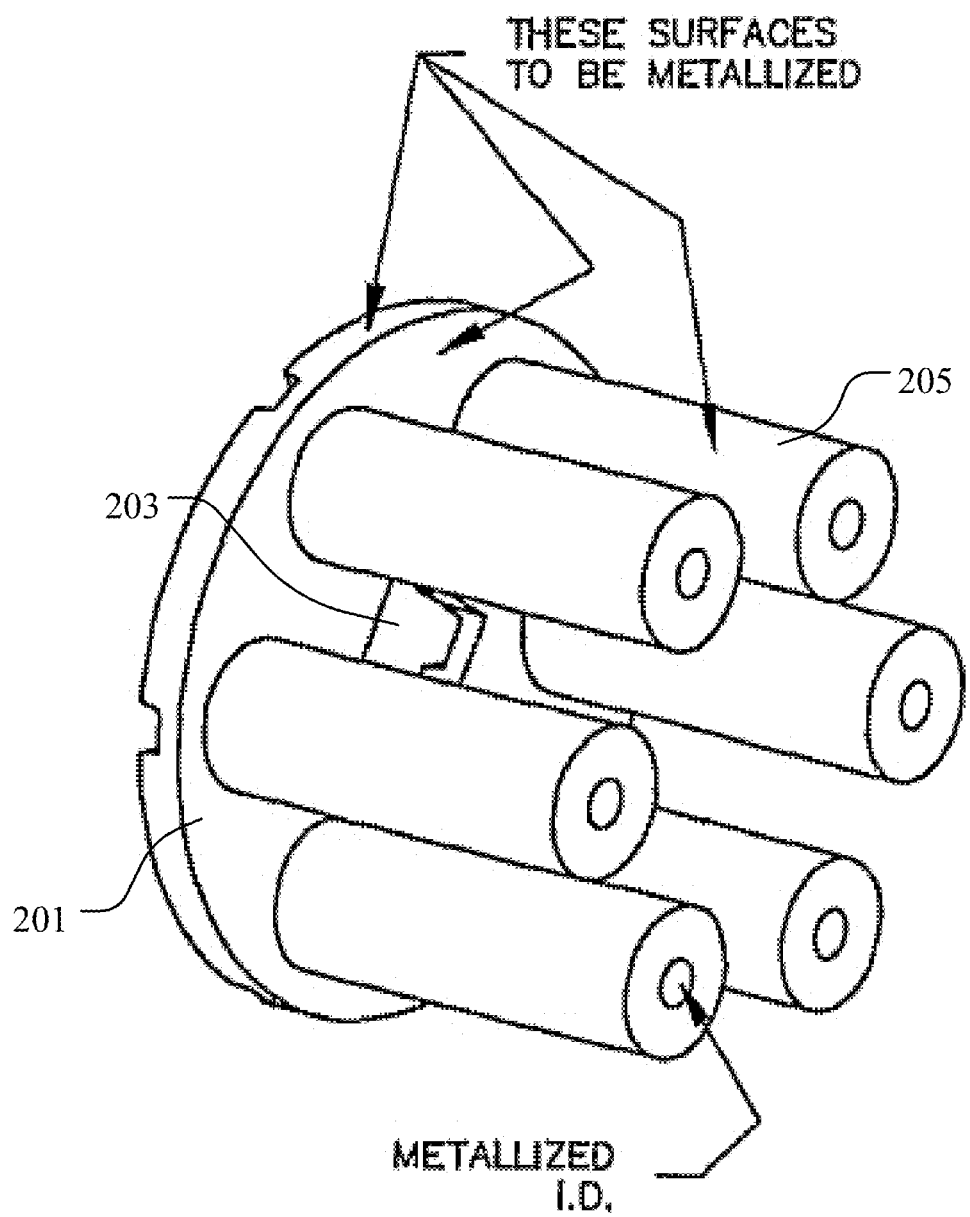

An example embodiment of the present disclosure, described herein, provides a header assembly for a pressure sensor and methods for manufacturing and using the same. For example, FIGS. 2A, 2B and 2C illustrate one embodiment of a header insert 200a-c in accordance with various aspects as described herein. FIG. 2A provides a top view of one embodiment of the header insert 200a. FIG. 2B provides a longitudinal cross-sectional view along section A-A of FIG. 2A of one embodiment of the header insert 200b. FIG. 2C provides a perspective view of one embodiment of the header insert 200c. In FIGS. 2A, 2B and 2C, the header insert 200a-c may be configured to include a base 201, an aperture 203 and a hollow cylinder 205. The header insert 200a-c may be composed of a contiguous material such as a ceramic material, a metallic material or the like. Further, the header insert 200a-c may form a seal between a header and a header pin. In one example, the base 201 may include a center thin disc of ceramic material. The base 201 may be disposed around and may define the aperture 203 for a sensor such as a pressure sensing chip. Also, the base 201 may be coupled to the hollow protrusion 205 such as a hollow cylinder. The hollow protrusion 205 may be used to form a seal between an inner surface of the hollow protrusion 205 and a surface of a header pin. The hollow protrusion 205 may be metalized on its outer surface for sealing to the header and also may be metalized on its inner surface for sealing to the header pin.

Figure 3A:
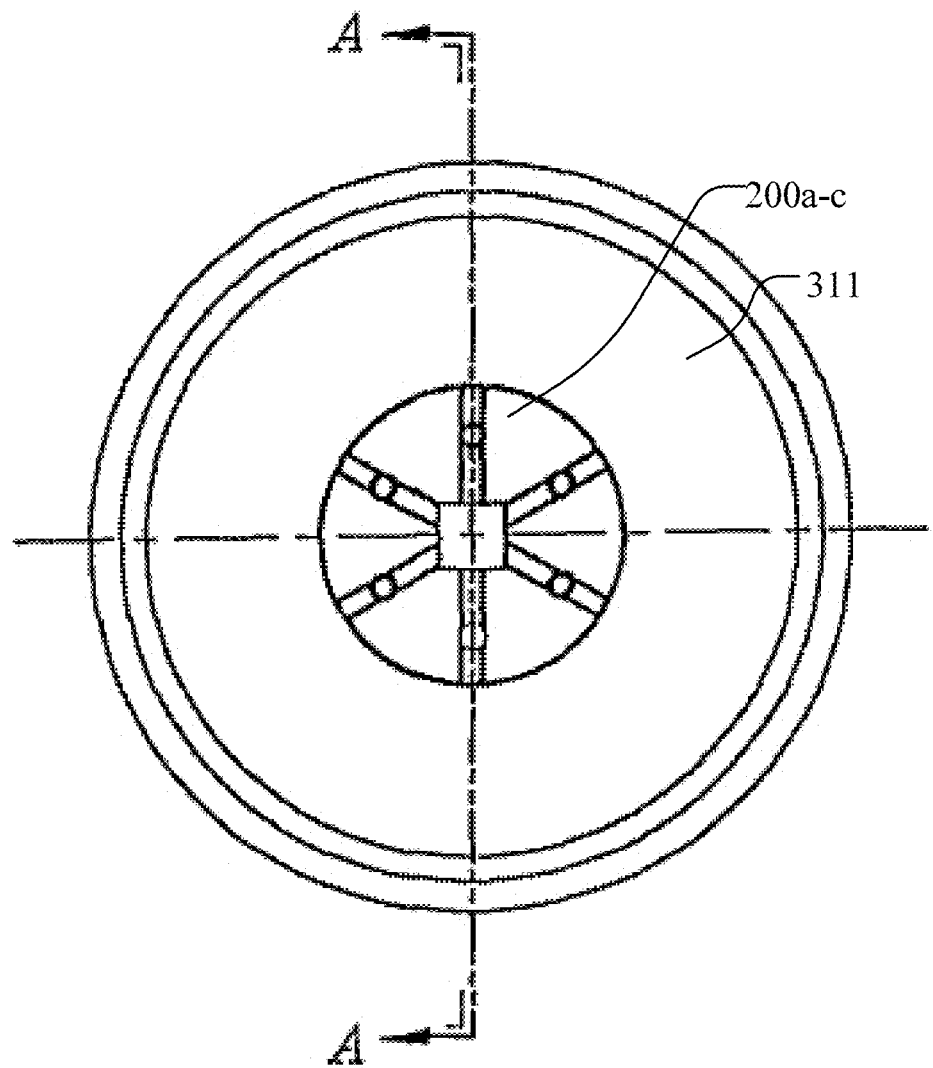
FIGS. 3A and 3B illustrate one embodiment of a header assembly in accordance with various aspects as described herein.
Figure 3B:
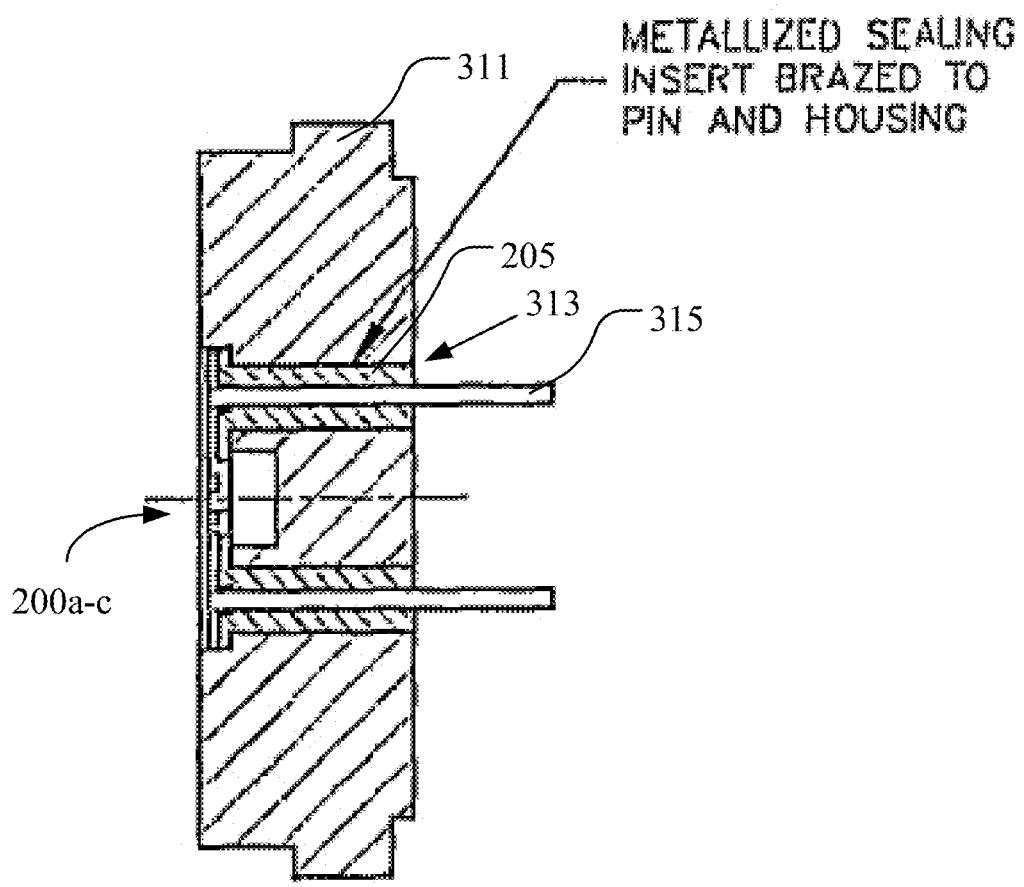

Another embodiment of the current disclosure, described herein, provides a header insert disposed in a header and brazed into place. For example, FIGS. 3A and 3B illustrate one embodiment of a header assembly 300a-b in accordance with various aspects as described herein. FIG. 3A provides a top view of one embodiment of the header assembly 300a. FIG. 3B provides a longitudinal cross-sectional view along section A-A of FIG. 3A of one embodiment of the header assembly 300b. In FIGS. 3A and 3B, the header insert 200a-c of FIGS. 2A, 2B and 2C may be inserted and coupled to a header 311. The header 311 may be disposed around and may define an aperture 313. The header insert 200a-c may be coupled to the header 311 such that the hollow protrusion 205a-c of the header insert 200a-c may be disposed in the aperture 313 of the header 311. The header pin 315 may be disposed in the hollow protrusion 205a-c of the header insert 200a-c. Further, the header insert 200a-c may be configured to include a groove in its body for ball bond wires between a pressure sensing chip and the header pin 315. In traditional implementations, a separate ceramic component is used to help protect the ball bond wires and also to displace oil volume from an oil filled header. The current disclosure describes replacing this separate ceramic component with the header insert 200a-c. This may reduce manufacturing complexity in assembling the header assembly 300a-b. Further, a single-piece construction of the header insert 200a-c may allow for more surface area over which to form a seal between the header insert 200a-c and the header 311. This increased surface area may provide a better seal between the sides of the header insert 200a-c and the sides of the header 311, resulting in reduced pressure leaks.

In another embodiment, a header assembly may be configured to include a header, a header insert and a header pin. The header may be disposed around and may define an aperture. The header insert may include a hollow protrusion and may be disposed around and define an aperture for a pressure sensor. The header insert may be coupled to the header such that an outer surface of the hollow protrusion is coupled to an inner surface of the header associated with the aperture. The header pin may be disposed in the hollow protrusion. The inner surface of the hollow protrusion may be coupled to the header pin. A seal may be formed between the header, the header insert and the header pin and may be used to reduce a pressure leak measured by the pressure sensor.

In another embodiment, a header insert may be composed of one contiguous ceramic material.

In another embodiment, a header may be composed of a metallic material.

In another embodiment, a header assembly may be configured to include a pressure sensor disposed in the aperture.

In another embodiment, a header insert may include a groove for a ball bond used to couple a contact of a pressure sensor to a header pin.

In another embodiment, an outer surface of a hollow protrusion of a header insert may be brazed to an inner surface of a header.

In another embodiment, an outer surface of a hollow protrusion of a header insert may be metalized.

In another embodiment, an inner surface of a hollow protrusion of a header insert may be brazed to a header pin.

In another embodiment, an inner surface of a hollow protrusion of a header insert may be metalized.

In another embodiment, an area of a seal formed between a header and a header insert may be at least a surface area of an outer surface of a hollow protrusion of the header insert.

FIG. 4 is a flowchart of one embodiment of a header assembly by a process 400 in accordance with various aspects as described herein. The header assembly may be configured to include a header, a header insert and a header pin. The header assembly may be disposed around and may define an aperture. Further, the header insert may include a hollow protrusion. In FIG. 4, the process 400 may start at, for instance, block 401, where it may include metalizing an inner surface and an outer surface of the hollow protrusion of the header insert. At block 403, the process 400 may include placing the header insert in the header such that the metalized outer surface of the hollow protrusion is disposed in the aperture and coupled to a surface of the header associated with the aperture. At block 405, the process 400 may include placing the header pin in the hollow protrusion such that a metalized inner surface of the hollow protrusion is coupled to the header pin. At block 407, the process 400 may include brazing the metalized outer surface of the hollow protrusion to the inner surface of the header and the metalized inner surface of the hollow protrusion to the header pin to form a seal.

In another embodiment, a header assembly by a process may include placing a pressure sensor in an aperture of a header insert.

In another embodiment, a header assembly by a process may include coupling a contact of a pressure sensor to a header pin.

In another embodiment, a header assembly by a process may include placing a ball bond in a groove of a header insert. Further, the header assembly by the process may include coupling a contact of a pressure sensor to the ball bond wire. Also, the header assembly by the process may include coupling a header pin to the ball bond wire.

It is important to recognize that it is impractical to describe every conceivable combination of components or methodologies for purposes of describing the claimed subject matter. However, a person having ordinary skill in the art will recognize that many further combinations and permutations of the subject technology are possible. Accordingly, the claimed subject matter is intended to cover all such alterations, modifications, and variations that are within the spirit and scope of the claimed subject matter.

Although the present disclosure describes specific examples, embodiments, and the like, various modifications and changes may be made without departing from the scope of the present disclosure as set forth in the claims below. For example, although the example methods, devices and systems, described herein are in conjunction with a configuration for the aforementioned header assembly for a pressure sensor and methods for manufacturing and using the same, the skilled artisan will readily recognize that the example methods, devices or systems may be used in other methods, devices or systems and may be configured to correspond to such other example methods, devices or systems as needed.

Further, while at least one example, embodiment, or the like has been presented in the foregoing detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required, or essential feature or element of any or all of the claims. Any benefits, advantages, or solutions to problems that are described herein with regard to specific examples, embodiments, or the like are not intended to be construed as a critical, required, or essential feature or element of any or all of the claims.

What is claimed is:

1. A header insert configured to couple to a header, the header insert comprising:
   a base with a metalized outer surface configured to seal with the header; and
   one or more hollow protrusions, each of the one or more hollow protrusions having a metalized inner surface configured to receive and seal with a corresponding header pin.

2. The header insert of claim 1, wherein the one or more hollow protrusions further comprise a metalized outer surface configured to seal with the header.

3. The header insert of claim 2, wherein the metalized outer surface of the one or more hollow protrusions is electrically separated from the metalized inner surface of the one or more hollow protrusions.

4. The header insert of claim 2, wherein the metalized outer surface of the base is configured to seal with a first portion of the header, and wherein the metalized outer surface of the one or more hollow protrusions is configured to seal with a second portion of the header.

5. The header insert of claim 1, wherein the base and the one or more hollow protrusions are composed of one contiguous material.

6. The header insert of claim 1, wherein the base and the one or more hollow protrusions are composed of a ceramic material.

7. The header insert of claim 1, further comprising an aperture configured for accepting a pressure sensor.

8. The header insert of claim 7, wherein the base includes one or more grooves for accepting bond wire to electrically couple one or more corresponding contacts of the pressure sensor to one or more corresponding header pins.

9. The header insert of claim 1, wherein the header comprises a metallic material.

10. The header insert of claim 1, wherein a shape of the hollow protrusion is a cylinder.

11. A method, comprising:
    metalizing an inner surface of a hollow protrusion of a header insert to form a metalized inner surface;
    metalizing a base of the header insert to form a metalized outer surface;
    placing the header insert in a header;
    placing a header pin in the hollow protrusion;
    forming a first seal between the header pin and the metalized inner surface of the hollow protrusion; and
    forming a second seal between the metalized outer surface of the base and the header.

12. The method of claim 11, wherein the header insert is composed of one contiguous material.

13. The method of claim 11, wherein the header insert is composed of a ceramic material.

14. The method of claim 11, further comprising placing a pressure sensor in an aperture of the header insert.

15. The method of claim 14, further comprising electrically coupling the pressure sensor to the header pin.

16. The method of claim 15, further comprising placing a ball bond wire in a groove of the header insert.

17. The method of claim 16, further comprising coupling a contact of the pressure sensor to the ball bond.

18. The method of claim 16, further comprising coupling the header pin to the ball bond wire.

19. The method of claim 11, wherein an area of the seal formed between the header and the base is at least a surface area of an outer surface of the hollow protrusion of the header insert.

20. The method of claim 11, wherein forming the seal comprises a single process step.

\* \* \* \* \*